United States Patent

[11] 3,598,927

[72] Inventors Frank E. Becker;
Walter F. Klein, both of Lexington, Ky.
[21] Appl. No. 809,322
[22] Filed Mar. 21, 1969
[45] Patented Aug. 10, 1971
[73] Assignee International Business Machines Corporation
Armonk, N.Y.

[54] EDUCATIONAL APPARATUS WITH PROGRAMMING FACILITIES
5 Claims, 23 Drawing Figs.

[52] U.S. Cl. 179/100.2DM, 35/35 C, 179/100.2 T
[51] Int. Cl. G11b 5/56, G11b 21/12
[50] Field of Search 179/100.2 MI, 100.2 A, 100.2 T; 346/74 M; 340/174.1 G, 174.1 H; 274/4, 4 J; 73/156; 35/8 A, 35 C, 9; 235/61.114

[56] References Cited

UNITED STATES PATENTS

| | | | |
|---|---|---|---|
| 3,221,420 | 12/1965 | Heinberg | 35/35 C |
| 3,412,483 | 11/1968 | Jacobs | 35/35 C |
| 3,471,654 | 10/1969 | Dollenmayer | 179/100.2 MD |
| 3,472,970 | 10/1969 | Basseches | 179/100.2 MD |
| 3,488,867 | 1/1970 | Lyon et al. | 179/100.2 T |

*Primary Examiner*—Bernard Konick
*Assistant Examiner*—Alfred H. Eddleman
*Attorneys*—Hanifin and Jancin and D. Kendall Cooper

ABSTRACT: Educational apparatus in the form of a recording/reproducing unit accommodates a record media comparable in size to the familiar IBM tabulation card. The media has printed information on one side such as questions and answers, circuit diagrams, etc. that are visible to the user when in operating position and recorded information on the opposite side positioned for scanning by a transducer during playback and record modes. Preferably, the media has either the visible information or the magnetically stored information, or both, divided into blocks of convenient size representing different questions, multiple choice answers, or the like, with the recorded information and the visible information correlated with one another. Programming structures are provided in the apparatus enabling the user to roughly scan toward a selected block of information on the media but defining a plurality of program stops arranged adjacent the beginning of each of the blocks of information and facilitating the positioning of the transducer with respect to the first track in a selected block.

PATENTED AUG 10 1971 3,598,927

INVENTORS.
FRANK E. BECKER
WALTER F. KLEIN

BY D. Kendall Cooper
ATTORNEY

EDUCATIONAL APPARATUS WITH PROGRAMMING FACILITIES

CROSS REFERENCES TO RELATED PATENTS AND APPLICATIONS

U.S. application Ser. No. 698,294 filed Jan. 16, 1968, inventors: F. E. Becker, et al.; entitled, "Magnetic Copy System."

U.S. Pat. No. 3,536,855 issued Oct. 27, 1970; inventors: C. L. Gardner, Jr. et al.; entitled, "Magnetic Information Transfer Apparatus."

U.S. Pat. No. 3,471,654 issued Oct. 7, 1969, inventor W. L. Dollenmayer; entitled, "Transducer Driving Arrangement For Recording and Reproducing Apparatus."

U.S. application Ser. No. 791,038 filed Jan. 14, 1969, inventor: W. L. Dollenmayer; entitled, "Memory Device For Recording And Reproducing Apparatus."

U.S. application Ser. No. 809,321 filed Mar. 21, 1969, inventors: F. J. Horlander, et al.; entitled, "Switching Parameters For Recording/Playback of Magnetic Media Having Different Coercivity and/or Retentivity Characteristics."

BACKGROUND OF INVENTION, INCLUDING FIELD AND PRIOR ART

Prior schemes for program selection in education apparatus has included manually operated structures as well as automatically operated structures. As an example, in one such device, a guide rod is positioned adjacent a document in use, the guide rod having a plurality of detent surfaces, each associated with a particular block of information on the media. A scanning means enables the user to position a transducer to any one of the detent positions. This requires that the user positively locate the desired detent area and carefully position the scanning means into that area alone. As another example, more automatic by nature, printed circuit elements are provided adjacent a media in use, having circuitry arranged in a motor driving circuit to enable the automatic location of individual blocks on a media. Prior schemes of this nature are usually characterized by complexity and/or require a high measure of concentration on the part of the operator of the equipment to effect the proper selection.

SUMMARY

The invention relates to educational apparatus having facilities for recording and reproducing information stored in a record media comparable to the familiar IBM tabulation card. The media has printed (visible) information on one side that conveys questions, answers, photographs, circuits, etc. to the user of the equipment when positioned in the apparatus. The media has information stored in magnetic form on the opposite side and scanned by a transducer that traces individual tracks back and forth across the media with an escapement taking place at the end of each track.

In a preferred arrangement, the visible information, but at least the magnetically stored information, is separated into blocks of convenient size representative of individual questions, answers, space for recording, etc. Also, the media may carry block identifying numbers for the visible information such as "2, 3, 4" respectively designating the second, third, and fourth blocks, and carry related blocks of magnetic information on the underneath side. The apparatus disclosed herein has escapement means in the form of a rack carrying teeth spaced in accordance with the track spacing on the record media and also has a program rack-carrying block defining teeth arranged in such a manner that the user of the equipment can readily scan the media to position the transducer in relation to a desired location by manual intervention and easily locate the beginning of a selected block of information. As an example, the program rack carries program stops 2, 3, and 4 corresponding respectively to blocks 2, 3, and 4 with the stops oriented on the rack in such a fashion that the user scans past the desired block location, then releases the scanning mechanism and pushes the scanning mechanism in the opposite direction against the selected stop. To illustrate, the operator in selecting block 2 first manually scans just past the stop representative of block 2, then releases the scanning mechanism, and by pressure exerted against the scanning mechanism moves the mechanism in the opposite direction back against the stop 2 thereby accurately positioning the scanning transducer adjacent the first track of block 2.

OBJECTS

Accordingly, an object of the invention is to provide educational apparatus having operator-oriented control mechanisms including programming controls enabling the rapid selection of a particular one of a plurality of blocks of information on a record media.

Another object of the invention is to provide educational apparatus having simplified control structures facilitating the learning process.

A further object of the present invention is to provide educational apparatus having recording, reproducing, and programming capabilities combined in a convenient package for most efficient and economical presentation of teaching materials.

A still further object of the invention is to provide in teaching apparatus, scanning facilities enabling the rapid location of the initial portions of blocks of information on a teaching media.

Also, an object of the invention is to provide educational apparatus with a variety of operational modes including a playback mode, record mode, and a compare mode in which signals from the media and spoken signals by the user are concurrently amplified for most pleasant association. A related object is to provide a record monitor mode of operation in which acoustic coupling is minimized but enabling the monitoring of signals during the recording operation.

Still another object of the invention is to provide apparatus of this nature that accommodates a wide variety of external accessory items.

Also, an object of the invention is to provide facilities in a teaching machine for utilizing teaching media in the form of conveniently proportioned card elements carrying, as an example, visible information as well as magnetically stored related information in audio form.

A primary object of the invention is to provide facilities in an educational machine for utilizing card-type media categorized into at least two kinds, such as master and copy media with provision for recognizing a distinguishing characteristic to enable handling of either type of media.

A further object of the invention is to provide a teaching apparatus in a portable form with simplified structures and circuits facilitating the use of the apparatus in a teaching environment.

The foregoing and other objects, features, and advantages of the invention will be apparent from the following more particular description of the preferred embodiment of the invention as illustrated in the accompanying drawings.

ENVIRONMENT AND MEDIA

The inventive arrangements set forth in connection with the apparatus disclosed herein are primarily advantageous in educational environments, such as, schools, language laboratories, factory assembly, or similar areas. The apparatus is portable in nature and is intended for particular use by an individual user, rather than a group, although there is no reason why several persons could not make use of the apparatus concurrently. The apparatus as described herein and as set forth in the various drawings has appropriate controls positioned for manipulation by the user to enable the establishment of various modes of operation including a Stop Mode, a Listen (Playback) Mode and a Record Mode. Typically, during use, the user has a headset inserted in a suitable receptacle in the device for listening to material that has been previously recorded on the record media. It is possible to make use of a microphone for recording information in a suitable area on the card, depending upon the media and the educational program in use.

Figure 9:
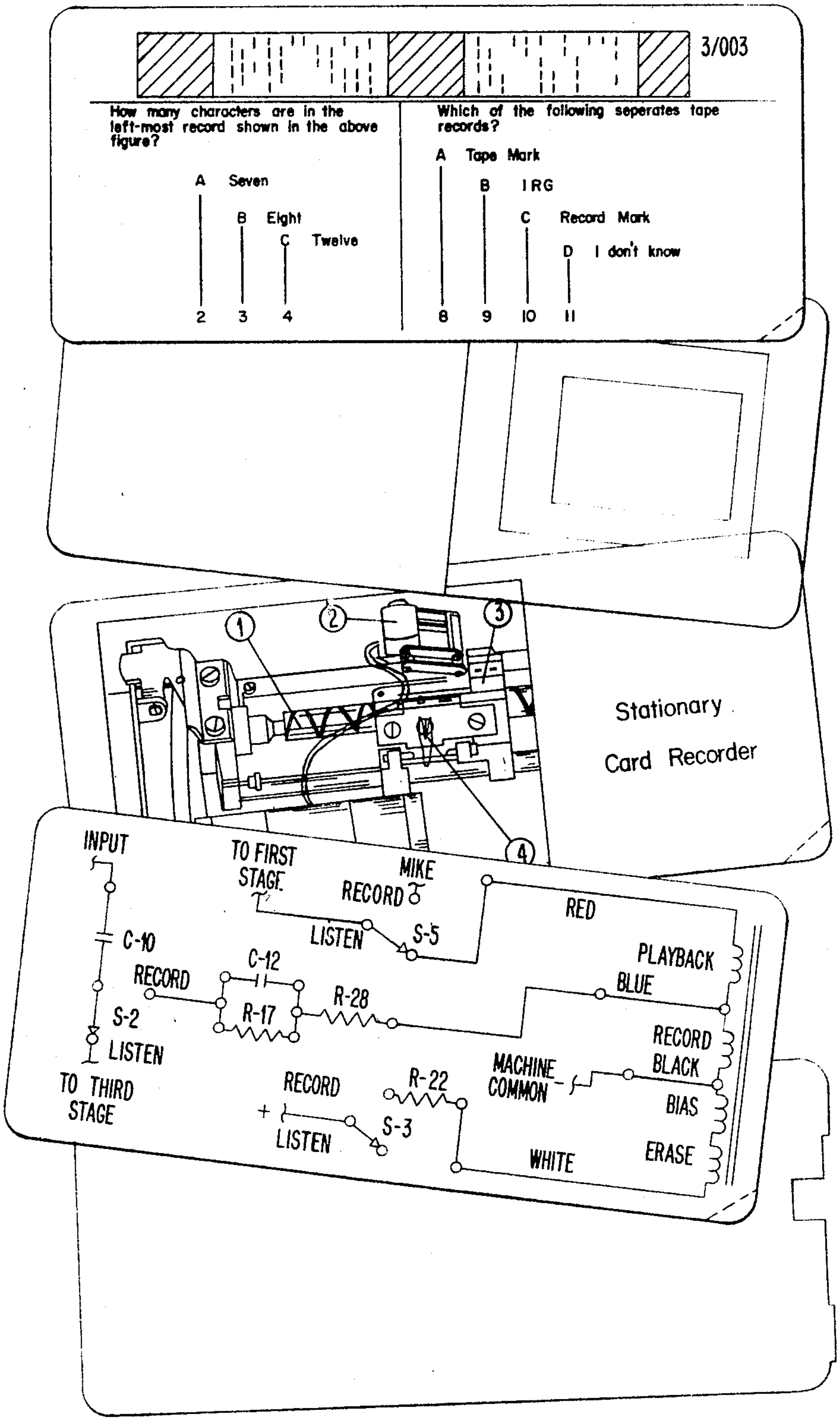
FIG. 9 represents five representative cards that are usable in the apparatus shown in the other figures. The top card is a question and answer-type card showing program stops 2, 3, 4 and 8, 9, 10, and 11 printed thereon. The second card is a variation having a left portion for storing information magnetically and a right portion with an aperture representative of a drawing, illustration, etc. that may be viewed directly or projected if desired on a screen. The third card represents a teaching media carrying a photograph on the front side and related magnetically recorded descriptive audio material on the reverse side. The fourth card shows a typical circuit diagram on the front side and has related descriptive audio information stored on the reverse side. The fifth card illustrates a master configuration having a notch at the rightmost end as a characteristic to distinguish the master from copy cards that may be used in the apparatus that do not carry such a notch. The first four cards from top to bottom in FIG. 9, therefore, represent copy cards, rather than master cards.

Reference is now made to FIG. 9 in particular which shows several kinds of cards that are representative of those that may be used in the apparatus. The cards typically have visible information on one side and magnetically stored audio information on the opposite side that is related to the visible information. This is true, for example, with respect to the first, third, and fourth cards shown in FIG. 9. The first card, as an example, has an illustration of data bit orientation on a magnetic tape and questions related to such orientation. The same questions are repeated in audio form on the reverse side of the card. The information is arranged in blocks with each block being selected by the user in a convenient and rapid fashion by use of the program structures disclosed herein. After listening to and viewing one of the questions, for example, the first question on the left of the top card in FIG. 9, the user selects one of the answers that he considers to be the correct one and by use of the scanning structures in the apparatus positions the transducer adjacent the selected answer. The procedure is repeated with respect to the question and answers on the right-hand portion of the top card in FIG. 9.

The visible and magnetically stored information on the record card may take many forms but as an example, can and preferably is arranged in blocks, each block defining an answer based on a question or some other capsule of information that is useful during the learning process. As shown in FIG. 9, the visible information can take a wide variety of forms. The magnetic information is preferably recorded in individual tracks across the narrow dimension of the card and may be in a "boustrophedonic" pattern as set forth in the Becker and Gardner patent applications noted in the cross-reference section above. Such a pattern involves the tracing of individual tracks illustrated in FIG. 1a, for example, with the first track being traced from left to right, the second track from right to left, the third track from left to right, the fourth track from right to left, and so on, with a standard predetermined escapement interval between the successive tracks. A suitable scanning mechanism and escapement mechanism is shown in the Dollenmayer case, Ser. No. 609,232, noted in the cross-reference section. An escapement memory useful in the present apparatus is set forth in the other Dollenmayer case, Ser. No. 791,038, also noted in the cross reference section.

A scanning and escapement arrangement such as those shown in the Dollenmayer cases may be structured in such a fashion that the transducer traces 50 tracks for each inch of longitudinal dimension of the record media. Effectively this gives a track spacing of 0.020 of an inch. In order to achieve such track spacing, the escapement includes a toothed escapement rack having teeth spaced 0.040 of an inch apart and engageable with two pawls in an alternate fashion to give an effective 0.020 inch escapement. While not intended to be limiting in any respect, the usual size of the tabulation kind of card is 7⅜ inches longitudinally by 3¼ inches across the narrow dimension. With such dimensions, it is possible to trace 300 individual tracks following one another in succession along the longitudinal dimension of the card. For the purposes of the present case, the 300 tracks are further divided into 15 major blocks of 20 tracks each. Accordingly, provision is made, as will subsequently be set forth, for the selection of any one of these 15 blocks of information. Since a record card is maintained in accurate registration throughout its use in the apparatus, the information on the media, both visible and magnetically recorded, is also accurately arranged with respect to the scanning and selecting mechanisms in the equipment. Accordingly, the user of the equipment may refer to the record card when positioned in the equipment and determine a particular block of information by reference to the printed information on the card as, for example, the top card in FIG. 9, thereafter move the transducer by means of a scanning lever in relation to any one of the programmed blocks indicated on the card and know that the transducer will be accurately positioned with respect to such information for scanning purposes.

GENERAL STRUCTURAL CHARACTERISTICS OF APPARATUS

Figure 1:
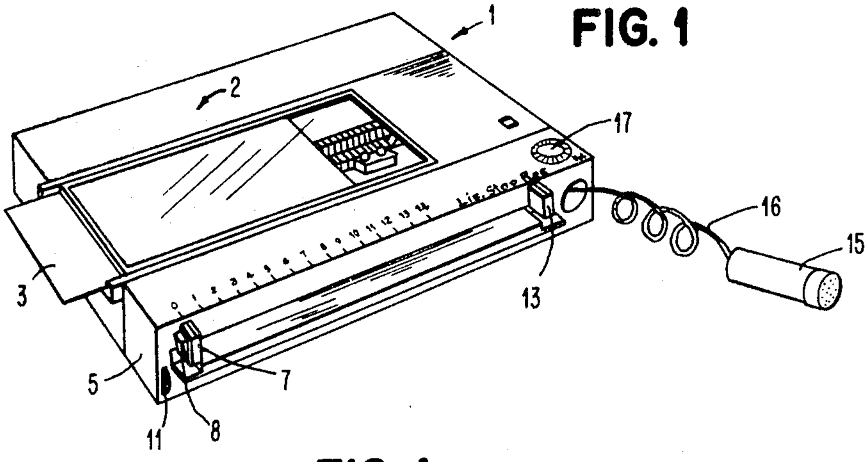
FIG. 1 is a left front perspective view of the teaching apparatus according to the present invention showing various operational controls, including a microphone, and showing a record card partially inserted.
Figures 1A, 2:
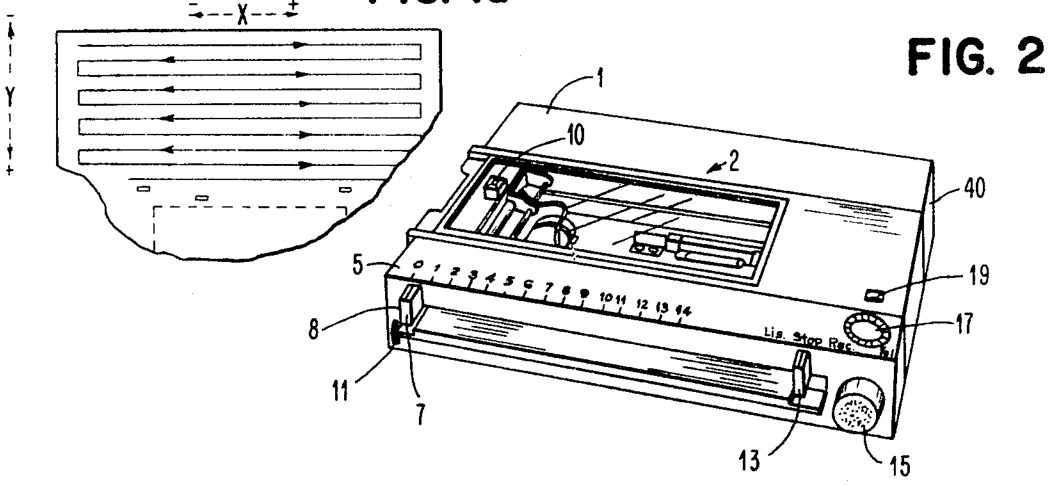
FIG. 1*a* illustrates a portion of a record media showing a typical transducer scanning pattern.
FIG. 2 is a right front perspective view of the teaching apparatus of FIG. 1 in condition for insertion of a record card.

FIGS. 1 and 2 represent perspective views of an educational apparatus incorporating the present inventive arrangements.

Figure 4A:
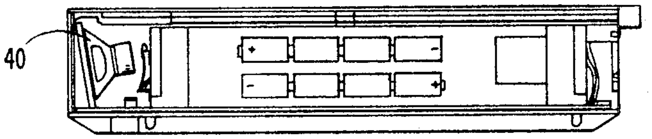
FIGS. 4a through 4f illustrate various elevations of the apparatus of FIGS. 1—3 with the main covers removed and representing respectively, a rear elevation, top elevation, left side elevation, right side elevation, front elevation, and bottom elevation.
Figure 4B:
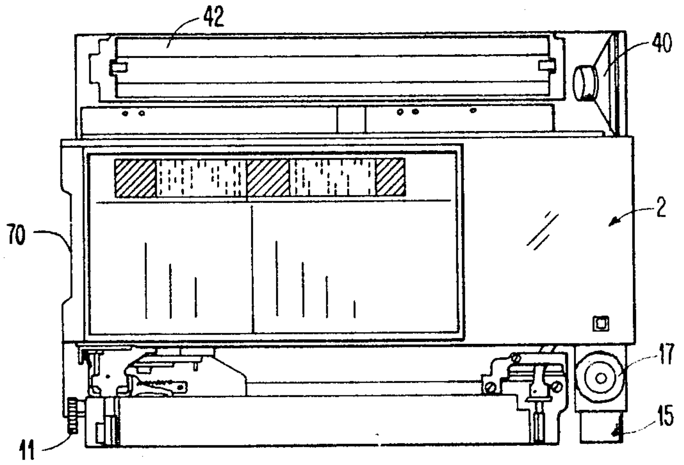

The apparatus 1 comprises a housing incorporating a number of operational controls and including a card guiding and positioning area 2 for accommodating a record card, such as those shown in FIG. 9. FIG. 2 represents the apparatus when not in use, that is, when no record card is in place. FIG. 1, on the other hand, shows a record card 3 inserted almost all the way into position. When fully inserted, a record card will appear as shown in FIG. 4*b*. The apparatus has a front removable cover 5 with designations 0 through 14 representative, respectively, of the 15 blocks of information on the record card 3. These numbers, therefore, serve as a guide for the user of the equipment besides the designations on the record media itself such as those on the top record card in FIG. 9. The apparatus includes a scan lever 7 (with a depressible serrated button 8) that is interconnected with the transducer carriage assembly to be discussed in greater detail in connection with FIGS. 5*a* through 5*c*, in particular, and that moves along in relation to the block designations 0—14 as the transducer scans the corresponding areas on the card 3. In a continuous scan type of operation, transducer 10, FIG. 2, will scan in relatively continuous fashion along the length of the inserted card 3 tracing the pattern of FIG. 1*a*. with the program capabilities the program capabilities taught herein, the user is able to depress button 8 and release the scanning assembly from the toothed rack previously alluded to and manually move the entire assembly to any desired location along the length of the card. As an example, he may select block 5 and if the scan lever 7 is positioned at block 1 he simply presses button 8 and moves the entire assembly to the right an appropriate distance to relocate the assembly adjacent the number 5. A phasing control 11 enables the accurate positioning of transducer 10 in relation to the tracks on card 3 in a known manner.

Mode control knob 13 is movable from a center Stop position to the left to a Listen (Playback) position or to the right to a Record position. The movement from the Stop position to the Listen position or vice versa simply requires pressure on lever 13 in the direction necessary. Movement from the Stop position to the Record position requires depression of lever 13 downwardly and then movement in the direction required. The unit includes a microphone 15 interconnected by cable 16 as shown in FIG. 1. Microphone 15 is stored in a suitable receptacle in front of the unit. Also provided is a volume control 17 for adjusting the signal level during playback and a record level indicator 19 that also serves to indicate the condition of the battery in the unit.

Figure 3:
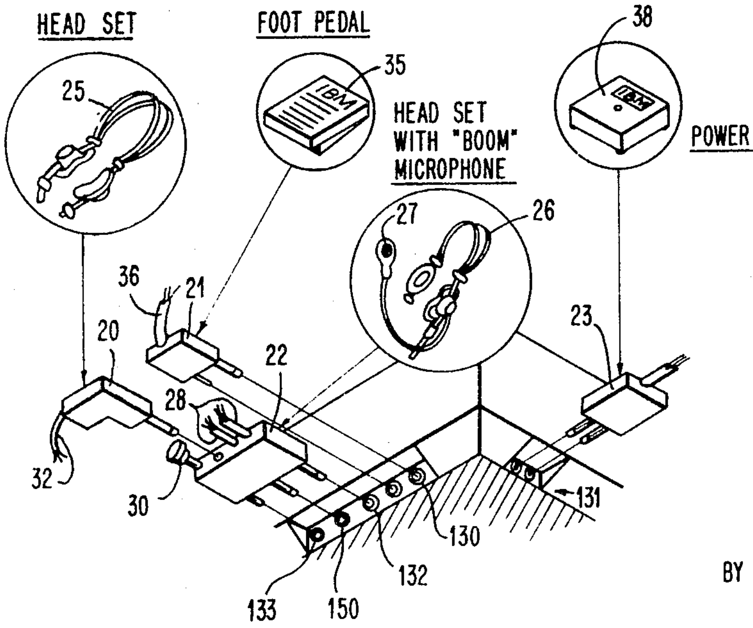
FIG. 3 is a diagrammatic representation of a portion of the apparatus of FIGS. 1 and 2 showing plug facilities and illustrating some of the external accessory devices that may be used with the apparatus.

Now referring to FIG. 3, various accessories usable with the apparatus of FIGS. 1 and 2 are illustrated in greater detail. Provided on the right rear lowermost corner of the apparatus are two sets of receptacles for receiving various kinds of jacks designated 20—23 shown in FIG. 3. Provision is made for accommodating several kinds of headsets including headset 25 designed solely for listening or headset 26 designed both for listening and speaking by the user through the transducer 27. Headset 26 is interconnected by wires 28 through jack 22 into the receptacles 132 and 150 indicated in FIG. 3. Jack 22 also carries a Compare button 30, that, when suitably depressed inwardly, switches the apparatus from a listen mode of operation during which the user is able only to listen to signals on an inserted card 3 to a Compare mode of operation during which he is not only able to listen to previously recorded signals on card 3 but is also able to speak into transducer 27 and hear his own voice in a natural way. This provides a desirable degree of association of the student with the recorded signals in language learning applications, as an example. Headset 25 is interconnected by wires 32 and jack 20 with the apparatus into the second receptacle from the front in jack 22 (to the right as viewed in FIG. 3). Start-Stop control of the apparatus, that is, starting and stopping of the scanning action may connected through wires 36 and jack 21 into the fourth and fifth receptacles shown in FIG. 3. An external power supply 38 is connectable through jack 23 into receptacles 131 positioned on the rear of the unit.

Figure 4C:
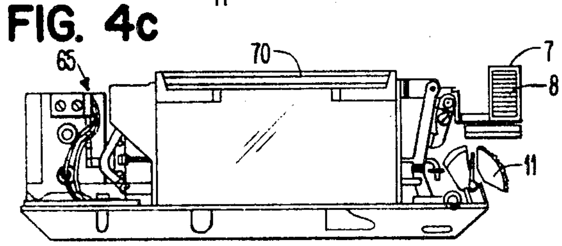
Figure 4D:
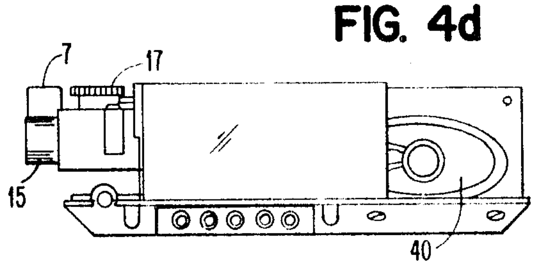
Figure 4E:
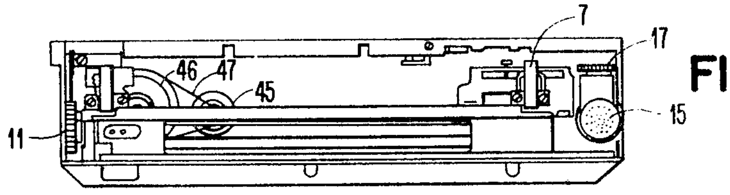
Figure 4F:
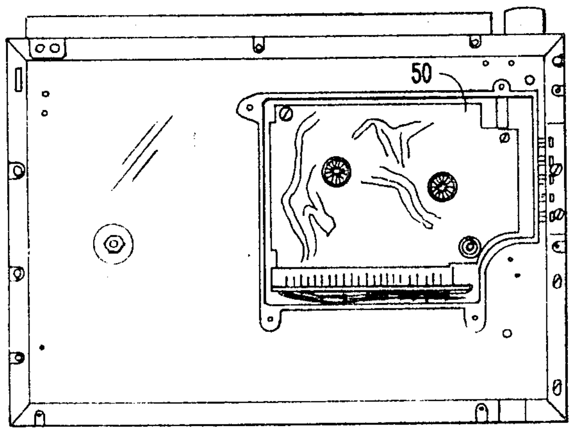

The reader is referred to FIGS. 4*a*—4*f* that illustrate various ones of the features just discussed as well as additional items not previously mentioned. The unit carries a speaker 40 positioned at the right rear corner and shown particularly in FIGS. 4*a*, 4*b*, and 4*d*. A group of batteries are positioned in a battery receptacle 42, FIG. 4*b*, as illustrated in the diagram in FIG. 4*a* to provide suitable power in the event the external power source 38 is not used. A motor 45 provides power to drive transducer 10 forwardly and backwardly across the card through pulley 46 and belt 47. This assemblage is shown in greater detail in FIG. 6. In FIG. 4*f*, which is a bottom elevation of the unit, the circuit board 50 incorporates a large number of amplifier stages and circuit components that are shown in greater detail in FIG. 8.

MEDIA GUIDING, POSITIONING, AND SENSING

Figure 5A:
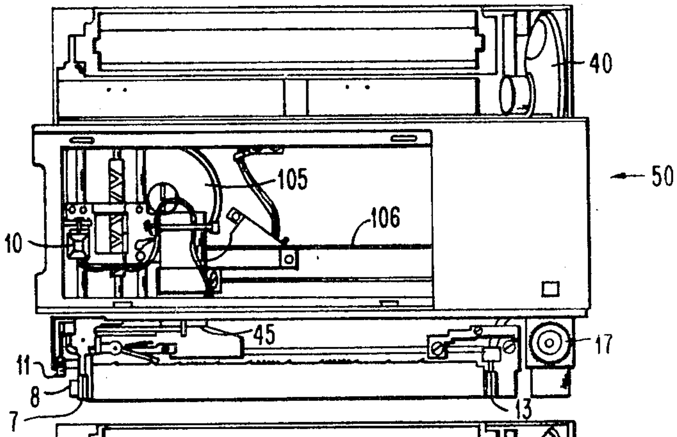
FIGS. 5a and 5b represent top elevations of the apparatus of FIGS. 1—4f showing the card guiding and positioning assembly in position with FIG. 5a illustrating the transducer scanning mechanism at home position in relation to a card media and FIG. 5b illustrating the transducer scanning mechanism positioned at the beginning of one of the blocks of information on the media. The media is not shown for reasons of clarity.
Figure 5B:
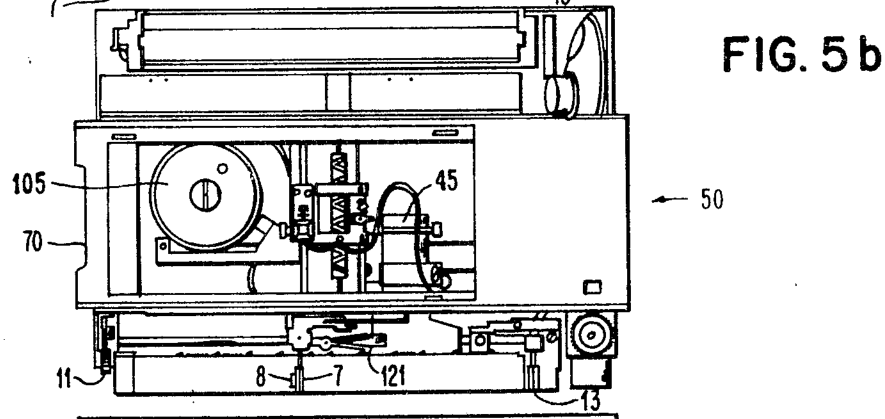
Figure 5C:
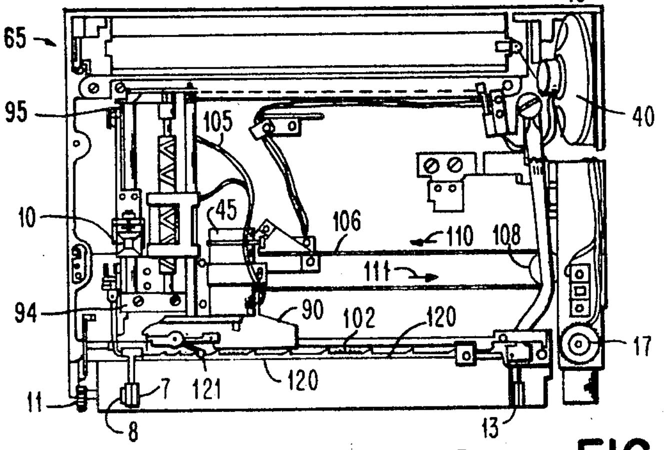
FIG. 5c is a top elevation of the apparatus with the car positioning assembly removed to facilitate identification and study of various other mechanisms in the apparatus.
Figures 5D, 5E, 5F, 5G:
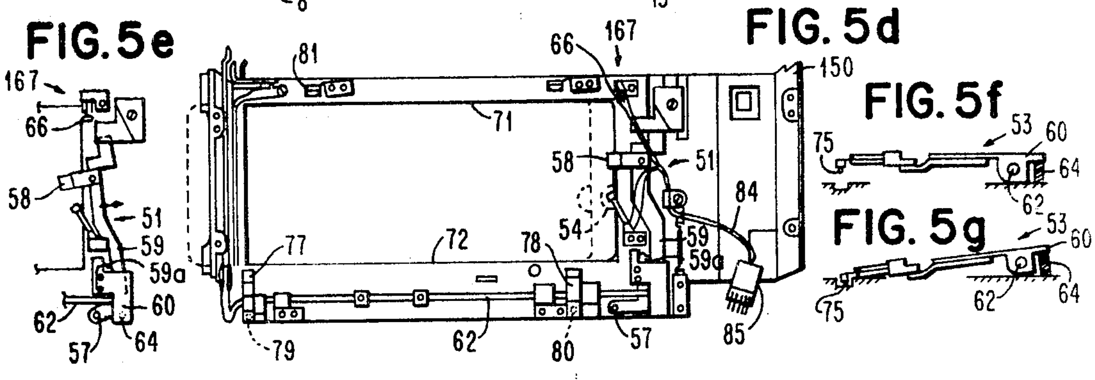
FIG. 5d shows the underneath side of the card positioning structure illustrating various latching members and switching assemblies.
FIG. 5e shows a card sensing linkage in an inactive state as it is when no card is positioned in the assembly of FIG. 5d.
FIGS. 5f and 5g, respectively, represent two states of a master-copy sensing assembly for sensing the distinguishing characteristics of these two types of cards.

The card guiding, positioning, and sensing assembly 50 is best seen in FIGS. 5*a*—5*g*. FIGS. 5*a* and 5*b* are top elevations of the educational apparatus with the positioning assembly located in its normal operating condition on the upper side of the unit. FIG. 5*c* is a top elevation of the educational unit with the card-guiding and -positioning assembly 50 removed. FIG. 5*d* is an underneath view of the card-guiding and -positioning assembly 50 showing various linkages, clamps, switch assemblies, etc. FIG. 5*e* is representative of a portion of the card-guiding and -positioning assembly of FIG. 5*d* illustrating the condition of a card-sensing latch assembly 51 when no card is in position. FIG. 5*d*, on the other hand, shows the card-sensing latch assembly 51 with a card in position. The assembly further includes a master-copy sensing switch assembly 53 shown more clearly in FIGS. 5*f* and 5*g* that recognizes the presence of a notch in master cards to control circuit operations as described later in the circuit section. The master-copy switch assembly 53 cooperates with a depression 54 formed in the base of the card-guiding and -positioning assembly 50. If one of the copy cards such as the top four cards in FIG. 9, is inserted in the unit, the leading edge of the card, having no notch, will rest above the depression 54 in the card-guiding and -positioning assembly 50 and prevent the master-copy switch sensing assembly from entering depression 54 as shown in FIG. 5*g*. If on the other hand, a master card having a notch, such as the fifth card in FIG. 9, is inserted into the unit, the notch permits the sensing switch assembly 53 to pass into depression 54 thereby transferring the switch contacts and altering the circuit operation.

Prior to insertion of one of the record cards, the unit will appear essentially as shown in FIGS. 2 or 5*a* with transducer 10 preferably positioned to the extreme left of the unit. The card sensing linkage 51, pivotally mounted at 57, FIG. 5*e*, is located in a relatively counterclockwise direction with a plastic finger 58 prepared for contact with the leading edge of a card as it is inserted in the unit. The card-sensing latch assembly includes link 59 with extension 59*a* that normally rests underneath a portion of an element 60 that supports part of the master-copy switch assembly. Element 60 is pivotally mounted on shaft 62 and biased in a counterclockwise direction by spring 64 as most clearly seen in FIGS. 5*f* and 5*g*. Extension 59*a* of link 59 holds element 60 in the condition shown in FIG. 5*f* prior to insertion of a card. Prior to insertion of a record card in the unit, a card-sensing switch assembly 65 FIGS. 4*c* and 5*c* is in an open condition.

It is now assumed that the user of the equipment wishes to insert a card for observation and scanning in the unit. The card is inserted in the left end of the unit in a slot area 70 that is most clearly visible in FIG. 4*c*. The card is inserted with the visible information in a normal readable position and on the upper face of the card. To clarify, the cards in FIG. 9 are shown as they would appear prior to insertion into the equipment. The user grasps the leftmost end of the card and inserts the rightmost end into slot 70. The top card in FIG. 9 will appear as shown in FIG. 4b when properly inserted in the unit. Since FIG. 5d represents the underneath elevation of the card-guiding and -positioning assembly 50, the magnetic oxide surface of the card will be on the side toward the viewer, in this case. An inserted card slides along edge guides 71 and 72 to an extreme right-hand location when it makes contact with finger 58 and swings link 59 about pivot 57 in a clockwise direction. This moves extension 59a from underneath element 60 of the master-copy switch assembly to the condition shown in FIG. 5d. Thereupon, spring 64 exerts pressure on element 60 and moves sensor 75 in a counterclockwise direction from the condition shown in FIG. 5f to that shown in FIG. 5g. As previously noted, if a copy card is in position, it will interfere with the counterclockwise movement of sensor 75 thereby preventing it from entering depression 54 in the assembly 50. If on the other hand, a master card having a notch is inserted, no interference exists and sensor 75 is able to enter depression 54. As it is inserted, a card encounter a pusher 66 in a prerecorded card-sensing switch assembly 167, thereby transferring the contacts in this switch assembly. A corner cut on any inserted prerecorded card prevents transfer of this switch assembly and thereby prevents the user from recording on the card, thereby retaining all information previously stored thereon. As element 60, which is fixedly but pivotally mounted to shaft 62, moves counterclockwise toward the condition shown in FIG. 5g, shaft 62 also rotates counterclockwise. Shaft 62 further carries card clamps 77 and 78 that are tensioned springs 79 and 80 against the surface of the inserted card to retain it in position. The card-guiding and -positioning assembly 50 also carries spring elements 81 and 82 that maintain a slight pressure on the edge of the card as it is moved into the unit to insure that it is properly located in guide 72 as it moves into the unit.

Figure 8A:
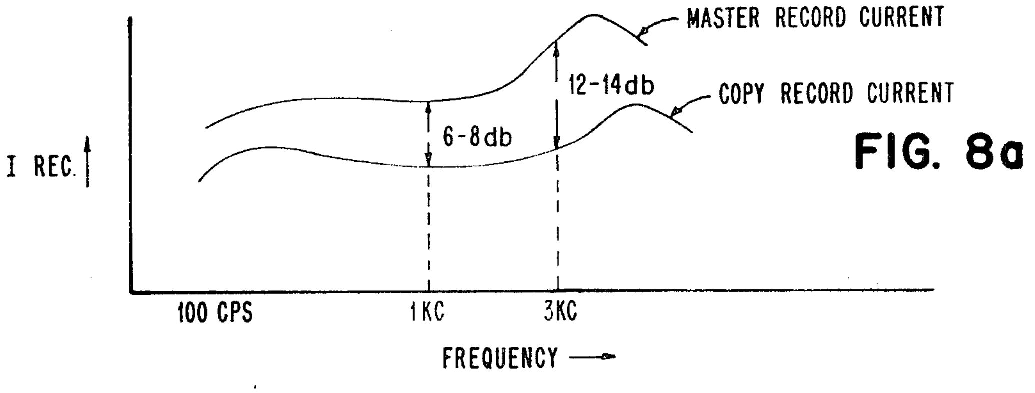
FIGS. 8 and 8a are a circuit diagram of the apparatus shown in the other figures illustrating various switching capabilities to establish the different modes of operation including a playback mode, record mode, record compare mode, etc. and including various amplifier stages, an oscillator stage, a record level indicator, and a motor control circuit.
Figure 8:
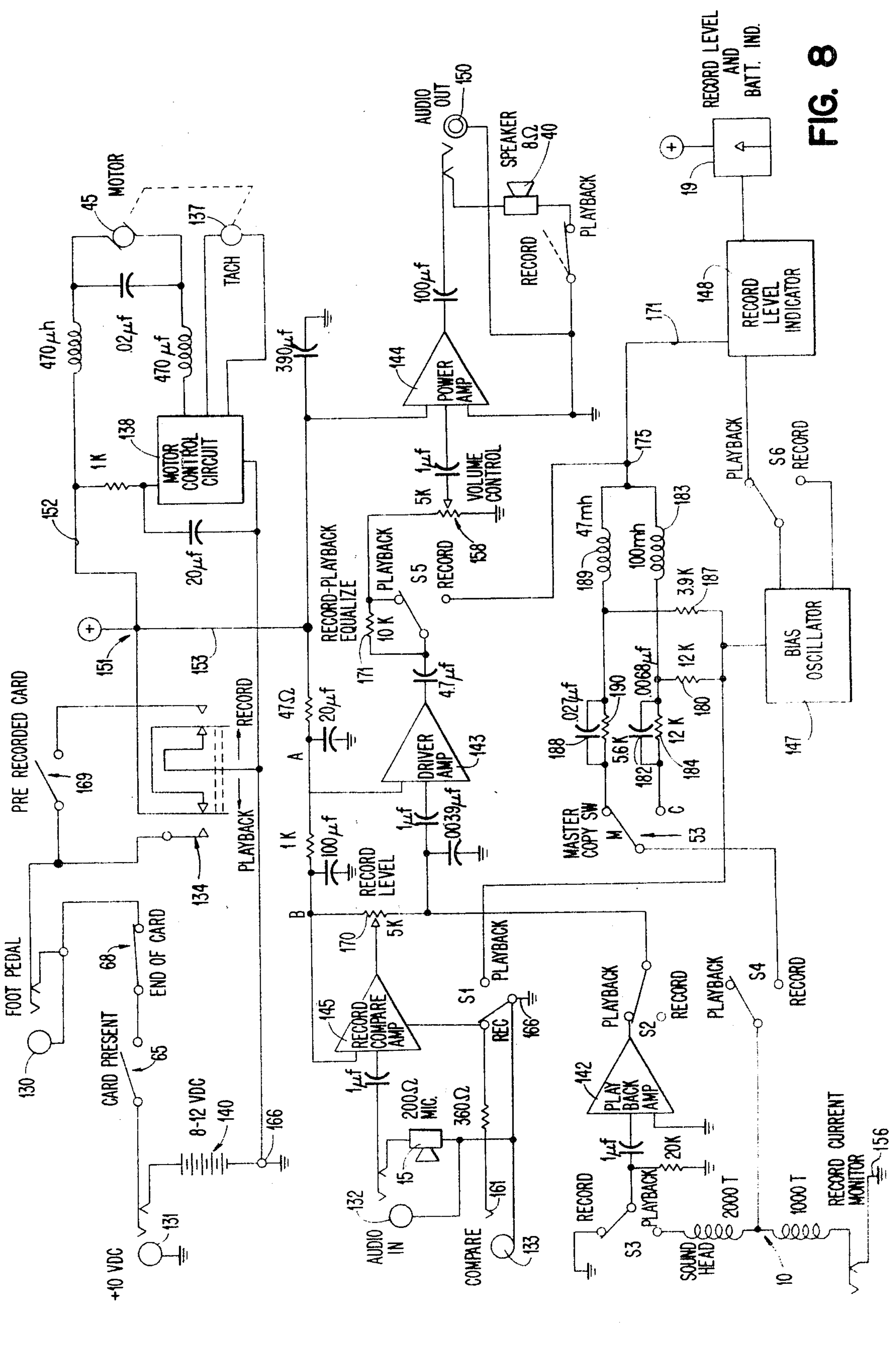

The various switch assemblies illustrated are connected by cable 84 and jack element 85 into the circuit shown in FIG. 8.

TRANSDUCER DRIVING, SCANNING, AND ESCAPEMENT

Figure 6:
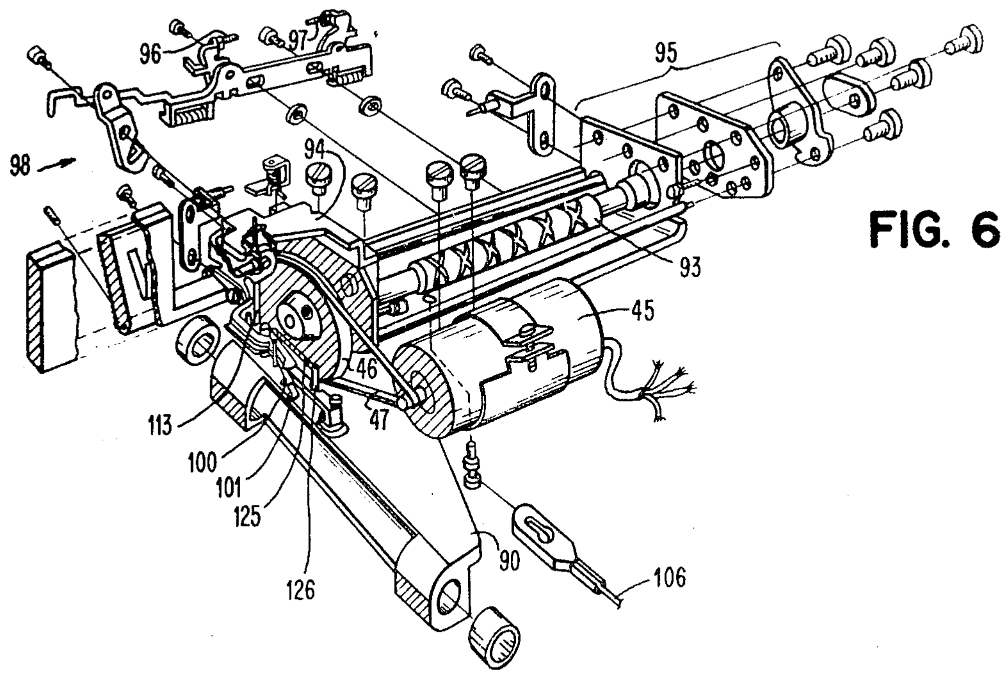
FIG. 6 is a semiexploded view of the transducer scanning assembly and motor driving mechanisms previously illustrated in FIGS. 5a through 5c.

Transducer 10 is mounted for driving and scanning movement on a carriage assembly 90 that is movable from left to right in the various figures, such as FIGS. 5a and 5b, for locating transducer 10 in proximity to a selected block of information on an inserted card or more specifically with respect to a particular desired track on an inserted card. The transducer driving and escapement mechanisms are arranged in such a manner that a signal path is traced as illustrated in FIG. 1a. This involves the movement of the transducer in a first direction across the width of the card, escapement of the transducer by one track spacing movement of the transducer in the opposite direction across the width of the card, escapement of the transducer by one track spacing, etc. Transducer driving arrangements provided herein are somewhat similar to those set forth in the Dollenmayer patent and the pending Dollenmayer application. The transducer driving arrangement for effecting the back and forth movement in first and second directions with respect to the card is illustrated particularly in FIG. 6. It may also be seen to advantage in FIGS. 5a, 5b, and 5c, in connection with FIG. 6, will clarify the driving arrangements. As noted briefly previously, power is furnished from an external source or from self-contained batteries in the battery compartment. When mode control lever 13 is in the Stop position, of course, no driving action takes place. However, movement of mode control lever 13 to either the Listen (Playback) or Record locations establishes circuit connections to apply power to motor 45 and thereby drive transducer 10. Motor 45 is connected with pulley 46 through belt 47 as best seen in FIG. 6. Pulley 46 is concentrically affixed to a lead screw member 93 supported by suitable brackets 94 and 95 supported on carriage assembly 90 and movable therewith. As set forth in the two Dollenmayer cases, transducer 10 is provided with a feed pawl that is engageable with grooves in lead screw 93. The driving of transducer 10 by lead screw 93 is somewhat comparable to the familiar fishing reel driving action wherein the engagement of the pawl on transducer 10 with the driving grooves in lead screw 93 effects a back and forth scanning action. As it scans back and forth and particularly as it reaches the end of travel in each scanning track, transducer 10 encounters elements 96 and 97 that form part of an escapement assembly 98 arranged for movement of escapement pawls 100 and 101 in an alternate fashion into and out of engagement with escapement rack 102. Escapement rack 102 may be seen in FIG. 7a also. Reference is made to the Dollenmayer cases for a more detailed description of the driving and escapement action involved. The principles set forth there are fully applicable to the present apparatus. To summarize, as transducer 10 reaches the end of each track, it encounters either element 96 or 97 and through the linkages shown effects disengagement of and reengagement of an alternate one of the pawls 100 or 101, depending upon which pawl is presently engaged with escapement rack 102.

In this manner, therefore, transducer 10 traces the "boustrophedonic" pattern of FIG. 1a. It is of interest in connection with the escapement action, that a spring motor 105 is interconnected with carriage 90 by cable 106 to exert a continuing pulling force that tends to move carriage 90 from left to right. As pawl 100 and 101 are alternately disengaged and engaged with escapement rack 102, the force exerted by spring motor 105 pulls carriage 90 one tooth or one track spacing to the right. The interconnection of spring motor 105 to carriage 90 is best seen in FIG. 5c where cable 106 passes from spring 105 first to the right (upper portion) around fixed pulley 108 and then to the left for connection with carriage 90. The force exerted by cable 106 in its upper and lower portions is indicated by arrows 110 and 111, respectively.

Figure 7B:
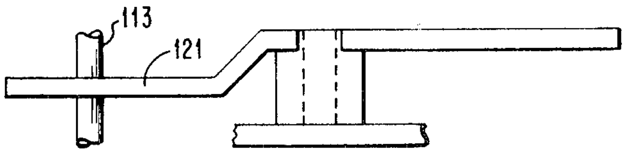
FIGS. 7a and 7b represent program stop assemblies that facilitate the rapid alignment of the transducer scanning means in the apparatus and the location of blocks of information on the media.
Figure 7A:
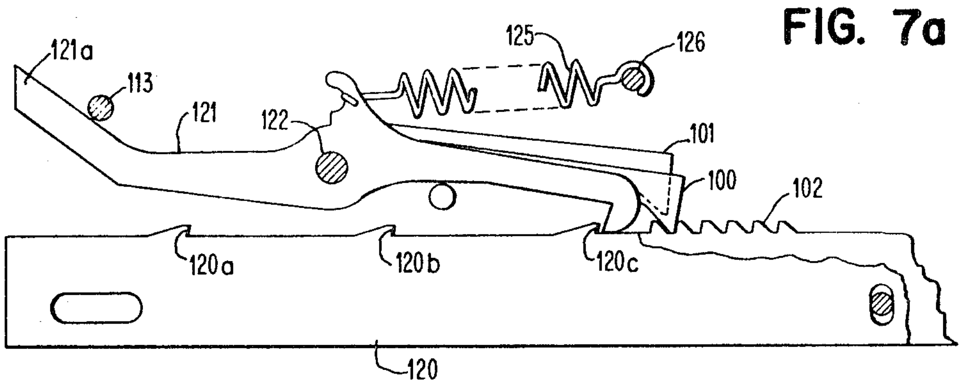

Normally, one or the other of the pawls 100 or 101 is in engagement with escapement rack 102 as shown in FIG. 7a. However, to effect manual scanning, button 8 on scan lever 7 is depressed which effects movement of pin 113, FIG. 6 against the tails of pawls 100 and 101 thereby disengaging both pawls from escapement rack 102. With the carriage thereby freed from escapement rack 102, the user is able to move the carriage from left to right or right to left in relation to its present position and position it in any desired location with respect to the card in use. If the operator of the equipment does not depress button 8 on scan lever 7, the angle of pitch of the teeth of escapement rack 102 prevents movement of carriage 90 to the right since one of the pawls 100 or 101 is in firm engagement with rack 102. However, it is possible to exert pressure on the right side of scan lever 7 and ratchet the engaged pawl 100 or 101 across the teeth in escapement rack 102 to the left until one of the program stops, discussed in the next section, is encountered.

PROGRAM STOPS

The present apparatus features a program stop arrangement that enables the accurate and rapid location of the beginning portion of blocks of information on an inserted record media. Positioned adjacent escapement rack 102 is a program rack 120 having a plurality of program stops or teeth 120a, 120b, 120c, etc. Program rack 120 is located in the educational unit in such a manner that the positions of stops 120a, 120b, etc. corresponds substantially to the location of the first track in each of a corresponding number of plurality or blocks of information on an inserted record card. These are also correlated with the numerical designations on the front cover of the unit which in this case are 0 through 14, representing 15 blocks of information on the record card. To further clarify, stop 120a corresponds with block 0, stop 120b corresponds with block 1, stop 120c corresponds with block 2, and so on. The program rack 120 is also accurately located so that the distance between successive program stops 120a, 120b, etc. corresponds to a predetermined number of tracks or escapement teeth on escapement rack 102.

Cooperating with program rack 120 is a program pawl 121, also shown in FIG. 7*b*, pivotally mounted on shaft 122 concentrically with respect to escapement pawls 100 and 101. Pin 113 operated by depression of button 8 on scan lever 7 is also operative against a tail portion 121*a* of program pawl 121 to disengage it from program rack 120 at the same time as pawls 100 and 101 are disengaged for manually scanning action.

With the structural arrangements shown, it is possible to manually select any desired block location on an inserted card. This is done by depressing button 8 on scan lever 7, moving scan lever 7 and carriage 90 to the right or to the left as desired, roughly locating the marker on lever 7 just to the right of the desired block number indicated on the front of the housing or card, releasing button 8 on lever 7, exerting pressure to the left on lever 7, and thereby ratcheting the engaged pawl 100 or 101 over the teeth in rack 102 and abutting program pawl 121 against the corresponding program tooth in program rack 120. If the carriage 90 and escapement mechanisms are presently located in block 0, as an example, and it is desired to relocate the assemblages to block 2, the operator of the unit depresses button 8, thereby releasing all of the pawls from their respective racks, moves lever 7 just past the 2 designation on the front of the unit, releases button 8, and thereafter by pressure exerted on lever 8 moves the entire assemblage to the left whereby program pawl 121 becomes engaged with tooth 120*c* on rack 120 in readiness for scanning the first track of block 2. As an incidental matter, reengagement of the various pawls with their respective racks 102 or 120, as the case may be, occurs due to spring tension exerted by a plurality of springs, such as spring 125, connected with program pawl 121. Spring 125 is connected to pin 126 mounted on carriage 90 and exerts a continuing clockwise force on pawl 121. Comparable springs are connected with the pawls 100 and 101 to exert a comparable force on these pawls, as well.

The foregoing program stop arrangements enable the user of the equipment to rapidly relocate carriage 90 and transducer 10 in relation to an inserted card with a minimum of training or attention on the part of the user. The technique for relocating transducer 10 is so simple and uncomplicated that it is readily learned by persons of all ages, particularly those of a very young age. The provision of the program stop structures insure a flexibility of use of the media and the educational apparatus described herein that would not otherwise be possible since it enables the user to readily move to other locations on the record media, either forwardly or backwardly in relation to a present position, thereby expanding the range of possible programming possibilities on the instructional materials.

CIRCUITS—GENERAL DESCRIPTION

FIG. 8 represents a circuit diagram for the apparatus just discussed and includes the elements that are mounted on circuit board 50 in FIG. 4*f*. The circuit is based on some known dictation circuit principles, but incorporates a number of unique features that are considerably advantageous in the present educational application. The circuit is operable in a number of modes including a Stop mode, Listen mode, Record mode, Compare mode, and Record monitor mode. A detailed description of each of the various modes of operation is presented in a later section but for the present, a general description will introduce the circuit principles of operation.

The circuit includes a variety of receptacle elements 130—133 and associated switching contact assemblies for controlling certain of the inputs depending upon which of the accessories in FIG. 3 is in use. A primary switch assembly 134 is operable from a central Stop position to the left to a Listen position or to the right to a Record position. The circuit shows motor 45 with associated tachometer 137 and having speed regulation under control of the motor control circuit 138. A source of potential, whether external, through receptacle 131 or internal, from battery 140 provides necessary power for motor 45 and the various other elements in the circuit. The circuit includes a number of amplifier stages including playback amplifier 142, driver amplifier 143, power amplifier 144, and record compare amplifier 145. A bias oscillator circuit 147 provides necessary alternating currents for superimposing a bias signal along with the record signal to insure linearity of recording. The bias oscillator is not operable in the listen mode of operation. A record level indicator circuit 148 drives the indicator 19 to indicate to the user during a record mode of operation what the record level of the signal is and to indicate to the user during a listen operation what the battery level is. Speaker 40 is shown and output terminal 150 which receives a pin from one of the headsets 25 or 26, FIG. 3 when their associated jacks are inserted. Operation of the mode control lever 13 also conditions various switch sections S1 through S6 into either the Listen or Record condition and depending upon whether mode control lever 13 is moved to the left or to the right from the central Stop position.

LISTEN (PLAYBACK) MODE

In normal circumstances, it is customary for a student to take one of the cards, such as those shown in FIG. 9, position it in the apparatus as previously described and then listen to questions and answers stored on the underneath side of the card by appropriate manipulation of the transducer 10 to desired blocks on the card and in accordance with the program stop feature previously discussed. Accordingly, the Listen mode is the first mode that will be described in detail.

Movement of mode control lever 13 to the left transfers the various contacts in switch assembly 134 to the Listen condition and also transfers the various switch sections Sl—S6 to the Listen condition. Battery 140 provides 8—12 volts DC potential. Card presence Switch 65 is now closed since a card is in position in the unit. End of card switch assembly 68 is presently closed since it is assumed that transducer 10 is located in some earlier portion of the inserted card and has not reached the end of the card as yet. The path for the potential from battery 140 continues through the foot pedal, presently closed, through the Listen contacts in switch assembly 134, now transferred and closed, to a primary terminal 151 that provides necessary potential to motor 45 by line 152 and to the other machine circuits by line 153.

The conditions of the various switches S1—S6 is such that the circuit connections enable the sensing of signals by soundhead transducer 10, their amplification and provision to either speaker 40 or an externally connected headset. Switch section S1 preconditions a circuit for possible use in a Compare mode of operation to be described shortly. Switch sections S2 and S3 cooperate with soundhead 10 to connect the windings of the soundhead from ground at point 156 through amplifier stage 142 and a one microfarad capacitor to the input of driver amplifier stage 143. Switch section S4, moved to the Listen condition, opens a circuit through some impedance networks to be described. Switch section S5 moved to the Listen condition connects the output of driver amplifier stage 143 through a volume control 158 to the input of power amplifier stage 144. An obvious path then exist from the output of power amplifier stage 144 to speaker 40 or to an externally connected headset. Switch section S6 connects a Zener diode in the oscillator circuit 147 to record level indicator 148 for use as a reference in order to make use of indicator 19 as a battery level indicator during the Listen mode.

The Listen mode continues as long as mode control lever is in the Listen position and enables the operator to listen to as much of the information stored on the card as he desires.

COMPARE MODE

If the student wishes to repeat phrases that he hears from the card during the Listen mode, he may do so by initiating a Compare Mode of operation by depressing button 30 inwardly in respect 133. This establishes a connection from ground at 160 through contact 161, and resistor 162 to the record compare amplifier stage 145, whereupon any signals spoken into transducer 27, as an example, are routed through receptacle 132 and directed into record compare amplifier stage 145. Record compare amplifier stage 145 incorporates a transistor that is normally connected through switch S1 when in a record mode directly to ground at 160. In order to avoid overloading the circuits during a compare mode of operation as just instituted, the transfer of switch section S1 to the Listen condition now inserts the 360 ohm resistor 162 in a series path from ground at 160 to the transistor in amplifier stage 145. Therefore, the gain of the stage is accordingly reduced when in a Compare mode. This enables signals from soundhead 10 and amplifier stage 142 to be directed to driver amplifier stage 143 as well as signals from the microphone or external transducer 27 (FIG. 3) through stage 145 without overdriving the succeeding amplifier stages 143 or 144.

In the Compare mode, accordingly, the student is able to listen to signals stored on the record media, such as language phrases, and concurrently, whether simultaneously or in a sequential manner, repeat the same phrases and listen to his own voice through the headset. This establishes a natural signal relationship for the student that is not otherwise available.

It is now assumed that the student moves mode control lever 13 to the central Stop position. This transfers the various contacts in switch assembly 134 to the condition shown in FIG. 8, removing power from motor 45 and from the various circuits by line 153. Also, through an obvious connection, ground is applied through switch assembly 134 from terminal 166 to terminal 151 to establish dynamic breaking of motor 45 bringing it to a rapid stop.

RECORD MODE

In order to establish a Record mode of operation, the operator moves mode control lever 13 to the right into the Record position from the Stop position. A potential is then supplied to motor 45 in a manner quite similar to that during the Listen mode of operation. It is interesting to note that the circuit also includes a prerecorded card switch 167 that is normally closed to complete the battery supply potential path through the switch assembly 134 when operated into a record condition. Switch 167 is in a closed condition when a card is inserted that it is possible to record on whether or not the card has previously stored signals or not. It is quite easy, with a card of this nature, to record the identical information if the system and apparatus described in the Becker patent application and Gardner patent is used for making additional copies by magnetic transfer process. Under some circumstances, however, it is desirable to use a prerecorded card which is supposed to be left in a prerecorded state during use. If a prerecorded card is inserted, a notch in that card prevents closure of switch 167 and thereby prevents the user from establishing a record mode of operation with respect to that particular card. With a card in position that is not prerecorded, switch assembly 167 is closed and the path for battery potential is now complete to motor 45 and to the various circuits shown in FIG. 8. Movement of lever 13 to the Record position transfers all of the switch sections S1 through S6 to the Record condition.

As previously indicated, switch section S1 provides a direct connection to ground at 160 for record compare that enables it to operate at full gain with respect to incoming signals from microphone 15 or from an externally connected transducer through accessory receptacle 132. Switch sections S2 and S3 are transferred to remove amplifier stage 142 from series connection with the various stages. Switch section S4 provides a path from the amplifier stages to transducer 10 for recording the signal after amplification. Switch section S5 is also in the circuit path and connects the output of driver amplifier 143 through the impedance networks shown in FIG. 8 directly above the bias oscillator stage 147. Switch section S6 connects oscillator stage 147 for a closed loop oscillator operation to provide bias signals for establishing proper linearity of the recorded signals.

The signal path is from microphone 15, as an example, amplifier stage 145, record level control 170, driver amplifier stage 143, Switch section S5 and through a master-copy switch which is in either the master or copy position, Switch section S4, now in a record condition, and transducer 10, ultimately for recording on the record media.

RECORD MONITOR MODE

Under some circumstances it may be desirable for the student to listen to the signal as it is being recorded. This is possible in a record monitor mode wherein a headset is connected for listening purposes by receptacle 150. An equalizing resistor 171 is arranged in parallel with switch section S5 when moved to a Listen condition. It is thereby bypassed and the full gain from amplifier 143 passes to amplifier stage 144. When in a record mode, however, switch section S5 is transferred to the record condition and resistor 171 is effectively in series with amplifier stages 143 and 144. This insures that comparable volumes exist during both a record and listen mode of operation regardless of the setting of volume control 158. A record-listen contact in series with speaker 40 is open when in a record mode and insures that feedback, that is, acoustic coupling, does not occur from speaker 40 back into microphone 15.

Switching Parameters For Processing Magnetic Record Media Having Different Coercivity And/Or Retentivity Characteristics Reference is made to the Becker and the Gardner cases which set forth apparatus for making duplicate copies of master record media using a magnetic flux transfer process. As described in those cases, the coercivity and retentivity characteristics of the master media and copy media differ purposely in order that a master signal pattern in the master record media is retained, but at same time is easily transferred as a duplicate pattern into the copy media. The copy media has lower coercivity-retentivity characteristics than the master media. This enables the retention of a master signal pattern in the master copy media for an indefinite period of time and through thousands of transfer operations without materially disturbing the pattern. As a corollary, the lower coercivity and retentivity characteristics of the copy media enable an easy transfer of the signal pattern.

It is quite desirable that provision be made for recording information in either type of media making use of common apparatus and circuitry and in accordance with the teachings of the present case, such is accomplished through a switching capability involving the alteration of the equalization of preemphasis networks in the recording path.

The principles involved can be observed by reference to the primary circuit diagram of FIG. 8 and to the explanatory graph of FIG. 8*a*.

A distinction is made between master and copy record cards by providing the master card with a notch as previously explained in connection with the cards in FIG. 9. If no notch is present, the apparatus herein recognizes the card as a conventional copy card having lower coercivity and retentivity characteristics and therefore requiring a lower recording current level. If, on the other hand, a master card, such as the lowermost card in FIG. 9, having a notch at the right edge is inserted in the apparatus, the notch permits the transfer of the master-copy switch 53 shown in FIGS. 5*d*, 5*f*, 5*g* and 8 to establish proper circuit conditions for handling the higher coercivity and retentivity characteristics of the master card which involves the establishment of higher recording currents.

In FIG. 8, the output of driver amplifier stage 143 passes through switch section S5 when in a Record mode to junction 175. From this junction, the signal is able to pass through either of two networks, depending upon the status of master-copy switch 53. If switch 53 is in the lowermost position, indicative of a copy cart the network including the 100 millihenry inductance, the 12k ohm resistor, and the 0.0068 microfarad capacitor are connected in series through switch section S4 to record head 10. This establishes a relatively lower recording current as illustrated in FIG. 8*a* that is suitable for a copy card.

If, however, switch 53 is in the master condition, indicative of a master card in position, then the signal from terminal 175 passes through the 47 millihenry inductance, the 5.6K resistor and the 0.027 microfarad capacitor and switch section S4 to head 10 to thereby establish the relatively higher recording currents and signal compensation indicated in FIG. 8*a*.

The recording action, whether for a master card or a copy card, involves the establishment of proper signal recording currents and high frequency bias.

Representative characteristics of the materials are as follows. The first material (master card) represents that used for the direct recording of master records. It is of high coercivity and high retentivity (Hc approximate to 600—700 Oe; Br approximate to 3,000—3,500 gauss). The second material (copy card) has nominal magnetic properties with Hc approximate to 250—300 Oe and Br approximate to 800—1,000 gauss.

In order to record on a master record both high frequency bias and signal record currents must be adjusted for the proper amplitudes and the recording equalization characteristics that will compensate for (1) all record/playback losses normally related to a direct magnetic recording system, (2) and compensates on the master record for both long and short wavelength losses that are related to magnetic copying processes.

Since master cards need a stronger signal level to properly serve as source media in the magnetic transfer process taught in the Becker and Gardner cases, the present apparatus distinguishes between them and copy cards for the purpose of establishing during a Record operation the proper signal levels and appropriate compensation of signal losses that may be anticipated in later transfer operations.

The circuits provide a shaped recording response characteristic to establish higher signal levels in master cards to compensate for nominal signal losses at nominal wavelengths and extreme signal losses at shorter wavelengths. As an example, signal loss of nominal signals centered about a wavelength of 0.003 inch corresponding to a frequency of 500 cycles per second and recorded at a speed of 1.5 inches per second maybe in the range of 4 db. Signal losses centered about shorter wavelengths, such at 0.0005 inch corresponding to a frequency of 3,000 cycles per second and also recorded at a speed of 1.5 inches per second may approach as much as 12 db.

The losses encountered during the transfer operation will depend on a number of factors including the strength of the transfer field, the characteristics of the media, etc. To compensate for such losses during subsequent transfer operations, the master card is intentionally overemphasized. at the higher current level of FIG. 8*a*. The master card, if played back in the present unit, will not necessarily be of suitable audio quality, but is ordinarily used for transfer operations anyway.

As indicated, FIG. 8*a* illustrates the related signal recording amplitudes versus the plot of frequency characteristics that may be suited to compensate recording/playback systems defined for the speech passband. Assuming a master recording is made and a copy is produced from it, it might be desirable for a listener once having played the magnetic copy to directly record a response adjacent to the copied audio. In order for the listener's response to have amplitude and frequency characteristics as the magnetic copy, the direct record signal current will be that as shown in lower curve of FIG. 8*a*. The master-copy switch (S2) is located adjacent to the magnetic card loading mechanism on the top casting of the machine. When a "copy" card is inserted, the high frequency bias current flows through resistor 180 and capacitor 182 while the signal record current flows through blocking inductor 183, and through the parallel combinations of resistor 184 and capacitor 182 These two currents are added together in the record winding of the magnetic head. If a master card is inserted in the machine, the bias current flows through resistor 187 and capacitor 188 while the record current flows through inductor 189 and the parallel combination of resistor 190 and capacitor 191.

In this manner, the apparatus automatically compensates for the two kinds of media with no conscious effort being required on the part of the operator of the equipment. The signal levels are thereby maintained compatible thereby providing considerable flexibility in the use of master and copy media and facilitating the learning process.

While the invention has been particularly shown and described with reference to several embodiments, it will be understood by those skilled in the art that various changes in form and detail may be made without departing from the spirit and scope of the invention.

What we claim is:

1. Apparatus for selecting a desired location from among a plurality of locations on a record media, comprising:
   - program means associated with said media, said program means having a plurality of program stops correlated with and corresponding in number to said plurality of locations, said program stops being oriented for engagement only from a preferred engaging direction; and
   - scanning means in said apparatus, said scanning means being arranged for movement both in said preferred engaging direction and in a nonengaging direction opposite to said preferred direction, and having a member normally engageable with individual program stops only when said scanning means is moved in said preferred engaging direction;
   - means for moving said scanning means at least in said preferred direction so that said engageable member moves into engagement with a selected one of said program stops corresponding to a said desired location and for moving said scanning means in said opposite nonengaging direction for manual random scanning;
   - and means for selectively positioning said engaging member out of engaging relation with said program stops to enable nonengaging random scanning by said scanning means when moved in said preferred direction, as well as said opposite direction.

2. The apparatus of claim 1 wherein:
   - said program means comprises a toothed rack having program stops in the form of individual teeth, each formed for engagement on a selective basis by said scanning means only when said scanning means is moved in said preferred direction.

3. The apparatus of claim 1 wherein each of said program stops is positioned on a periodic basis to encompass two or more locations on a record media, therefore defining a block of information such as a question, an answer, a recording location, or the like.

4. The apparatus of claim 2 wherein said locations are further divided into a plurality of tracks and further comprising:
   - escapement means associated with said program means and normally engaged with said scanning means for effecting escapement of said scanning means on a track-by-track basis.

5. The apparatus of claim 4 further comprising:
   - manually operable release means for concurrently disengaging said program means and said escapement means to enable free movement of said scanning means in relation to said media, as desired by the user.